United States Patent [19]

Ikari

[11] Patent Number: 5,092,153
[45] Date of Patent: Mar. 3, 1992

[54] APPARATUS FOR CONTROLLING VARIABLE DELIVERY HYDRAULIC MOTOR UPON HYDRAULICALLY OPERATED VEHICLE

[75] Inventor: Masanori Ikari, Saitama, Japan

[73] Assignee: Komatsu MEC Corp. Kabushiki Kaisha Komatsu Seisakusho, Japan

[21] Appl. No.: 499,447

[22] PCT Filed: Nov. 8, 1989

[86] PCT No.: PCT/JP89/01147
 § 371 Date: Jun. 25, 1990
 § 102(e) Date: Jun. 25, 1990

[87] PCT Pub. No.: WO90/05254
 PCT Pub. Date: May 17, 1990

[30] Foreign Application Priority Data

Nov. 8, 1988 [JP] Japan .................. 63-144985[U]

[51] Int. Cl.⁵ .............................................. B60K 41/04
[52] U.S. Cl. ...................................... 74/880; 60/449; 60/491
[58] Field of Search ............... 74/880, 886; 60/449, 60/447, 491

[56] References Cited

U.S. PATENT DOCUMENTS

| | | | |
|---|---|---|---|
| 3,665,787 | 5/1972 | Wilkinson | 74/880 X |
| 3,842,694 | 10/1974 | Marlow | 74/880 X |
| 3,913,325 | 10/1975 | Miyao et al. | 74/880 X |
| 4,254,672 | 3/1981 | Mizuno et al. | 74/880 X |

FOREIGN PATENT DOCUMENTS 0321622 6/1989 European Pat. Off. .......... 74/880

*Primary Examiner*—Leslie A. Braun
*Assistant Examiner*—William O. Trousdell
*Attorney, Agent, or Firm*—Ronald P. Kananen

[57] ABSTRACT

There is disclosed an apparatus which controls a variable delivery motor installed on a hydraulically operated vehicle in such a way that the maximum vehicle speed can be continuously varied without sacrificing the performance of the nonstep variable speed, hydraulically operated vehicle. The apparatus includes a hydraulic pump (1) connected with the variable delivery hydraulic motor (2) by main circuits (24, 25), a cylinder (31) that controls the motor (2), a control pump (3) delivering pilot pressure, and a vehicle speed limiter (122). Higher pressure is produced inside the main circuits. The limiter limits the minimum capacity of the motor (2), depending on the higher pressure and also on the pilot pressure acting on the cylinder (31).

7 Claims, 6 Drawing Sheets

APPARATUS FOR CONTROLLING VARIABLE DELIVERY HYDRAULIC MOTOR UPON HYDRAULICALLY OPERATED VEHICLE

FIELD OF THE INVENTION

The present invention relates to an apparatus for controlling a variable delivery hydraulic motor installed on a shovel loader or other hydraulically operated industrial vehicle equipped with a lifting implement as well as the variable delivery hydraulic motor and, more particularly, to an apparatus for controlling a variable delivery hydraulic motor installed on a hydraulically operated vehicle the speed of which can be varied continuously and the maximum speed of which is required to be controlled according to the operating conditions.

BACKGROUND OF THE INVENTION

The prior art hydraulic circuit for a hydraulically operated vehicle which uses a variable delivery hydraulic pump and a motor and the speed of which can be varied continuously is shown in FIG. 1, where a part of the output from an engine 5 drives a hydraulic pump 4 installed on a working machine. This machine further includes a hydraulic circuit 51 and a hydraulic cylinder 52. The engine output acting on the pump 4 is transmitted to the cylinder 52 via the hydraulic circuit 51. The remaining portion of the output from the engine 5 drives a control pump 3 and a hydraulic pump 1. The pressurized oil produced by the hydraulic pump 1 is forced into a variable delivery hydraulic motor 2 via main circuits 24 and 25 to rotate the motor 2, thereby driving the vehicle. The capacity of the hydraulic pump 1 is controlled by a valve 6 and a cylinder 7. Also shown are main relief valves 8, a charge relief valve 9, and a filter 10. Pressurized oil delivered from the valve 6 is passed through a motor control oil passage 11 and guided to one end of a motor control valve 14. Oil which is at the higher pressure is forced through a pilot pipe 16 from the main circuits 24 and 25 and then into a cylinder 31 that controls the capacity of the motor 2.

That is, the pump control valve 6 and the motor control valve 14 control the cylinders 7 and 31, respectively, to arbitrarily vary the capacities of the hydraulic pump 1 and the hydraulic motor 2, respectively, for changing the speed of the vehicle.

In this nonstep variable speed, hydraulically operated vehicle using the prior art variable delivery hydraulic motor, the driving power and the speed of the vehicle can be varied continuously. The speed can be automatically changed from 0, i.e., the maximum driving power, to the maximum speed without the need to manually vary the speed. Since the operator can control both vehicle speed and driving power only with the accelerator pedal, the operation is easier to perform than a vehicle equipped with a mechanical transmission.

On the other hand, in an industrial vehicle having a lifting implement such as a shovel loader, the pump of the lifting implement such as the pump 4 is driven by an engine such as the engine 5 in the same way as the hydraulic pump 1. The maximum speed of ascent of the lifting implement is proportional to the engine speed and so the speed of ascent of the lifting implement is controlled according to the position of the accelerator pedal in the same way as the vehicle speed.

Accordingly, where the vehicle moves while elevating the lifting implement in a narrow working site in which the vehicle travels a short distance, if the lifting implement is elevated at the maximum speed while moving the vehicle at a low speed, then the working efficiency is high. In the prior art techniques, however, if the lifting implement is elevated at the maximum speed, it is inevitable that the vehicle speed is increased to its maximum speed.

One conventional method for eliminating such a conflicting relation between the vehicle speed and the ascending speed of the lifting implement is to keep the motor capacity at the maximum capacity while suppressing the vehicle speed. Another conventional method is to connect a mechanical transmission with the motor, for switching the speed between several discrete values. Where the former method is adopted, the motor capacity is fixed and, therefore, the vehicle speed is limited to low values. Where the latter method is employed, the maximum driving power cannot be obtained within a high range. Therefore, it is impossible to cope with the operating conditions accurately.

SUMMARY OF THE INVENTION

In view of the foregoing, the present invention has been made. It is an object of the invention to provide an apparatus acting to control a variable delivery hydraulic motor on a hydraulically operated vehicle in such a way that the maximum speed of the vehicle can be continuously varied without sacrificing the performance of the nonstep variable speed vehicle.

In one embodiment of the invention, an apparatus for controlling a variable delivery hydraulic motor installed on a hydraulically operated vehicle comprises main circuits connecting a hydraulic pump with the variable delivery hydraulic motor, a cylinder controlling the capacity of the motor, a control pump acting on the cylinder and producing pilot hydraulic pressure, and a means acting to limit the minimum capacity of the hydraulic motor according to the pilot hydraulic pressure and the higher hydraulic pressure inside the main circuits.

In this embodiment, the vehicle speed best suited to the operating conditions can be obtained. The best compromise is stuck between the speed of a working machine such as a lifting implement and the road speed of the vehicle.

The above and other objects, features, and advantages of the invention will be apparent to those skilled in the art on consideration of the accompanying drawings and following specification wherein are disclosed the preferred examples according to the inventive principles.

DESCRIPTION OF THE PREFERRED EMBODIMENTS

Figure 1:
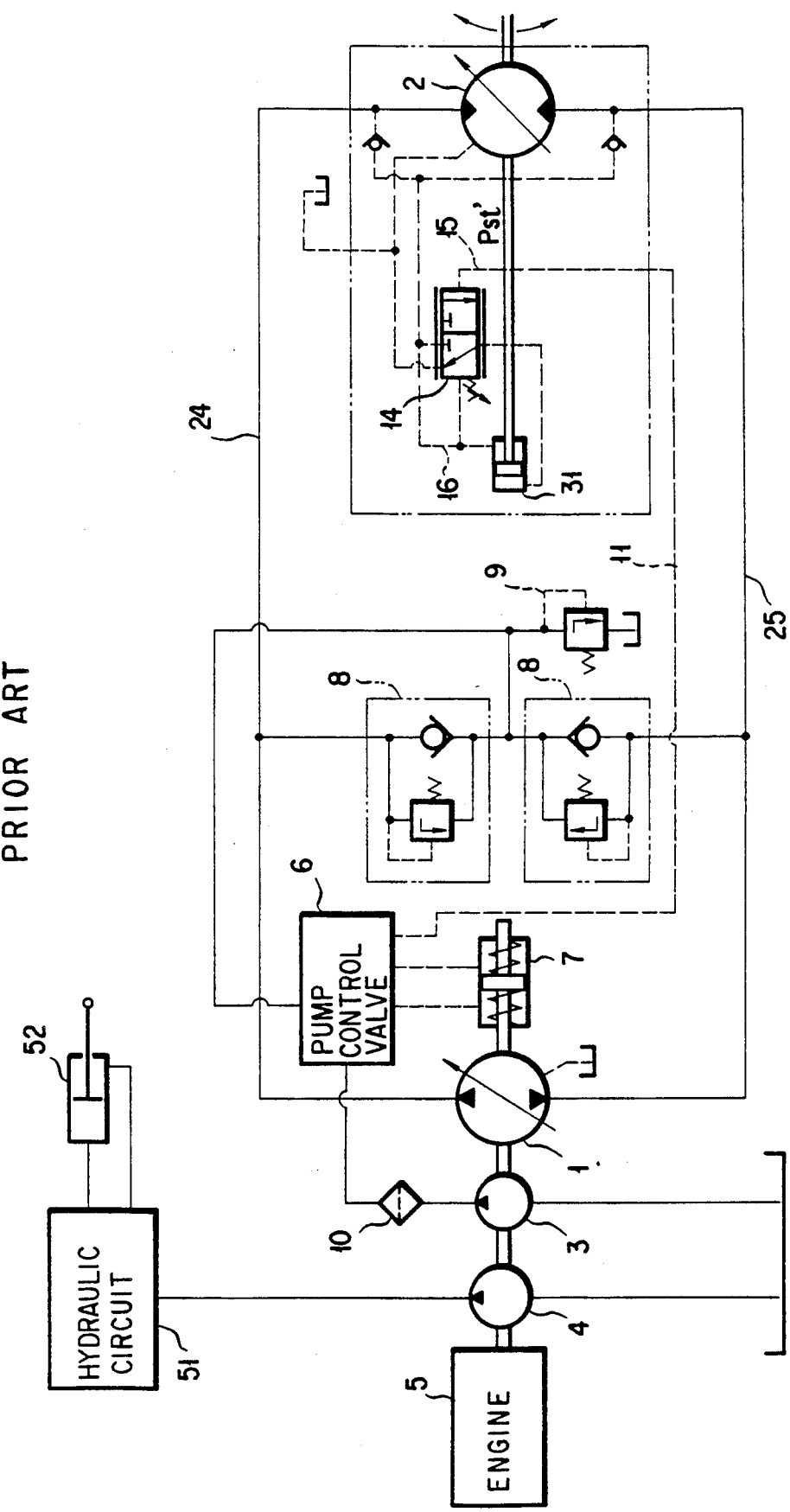
FIG. 1 is a diagram of the prior art hydraulic circuit installed on a hydraulically operated vehicle.

It is to be noted that like components are denoted by like reference numerals in the accompanying drawings and that those components which have been already described in connection with FIG. 1 will not be described in detail below.

Figure 2:
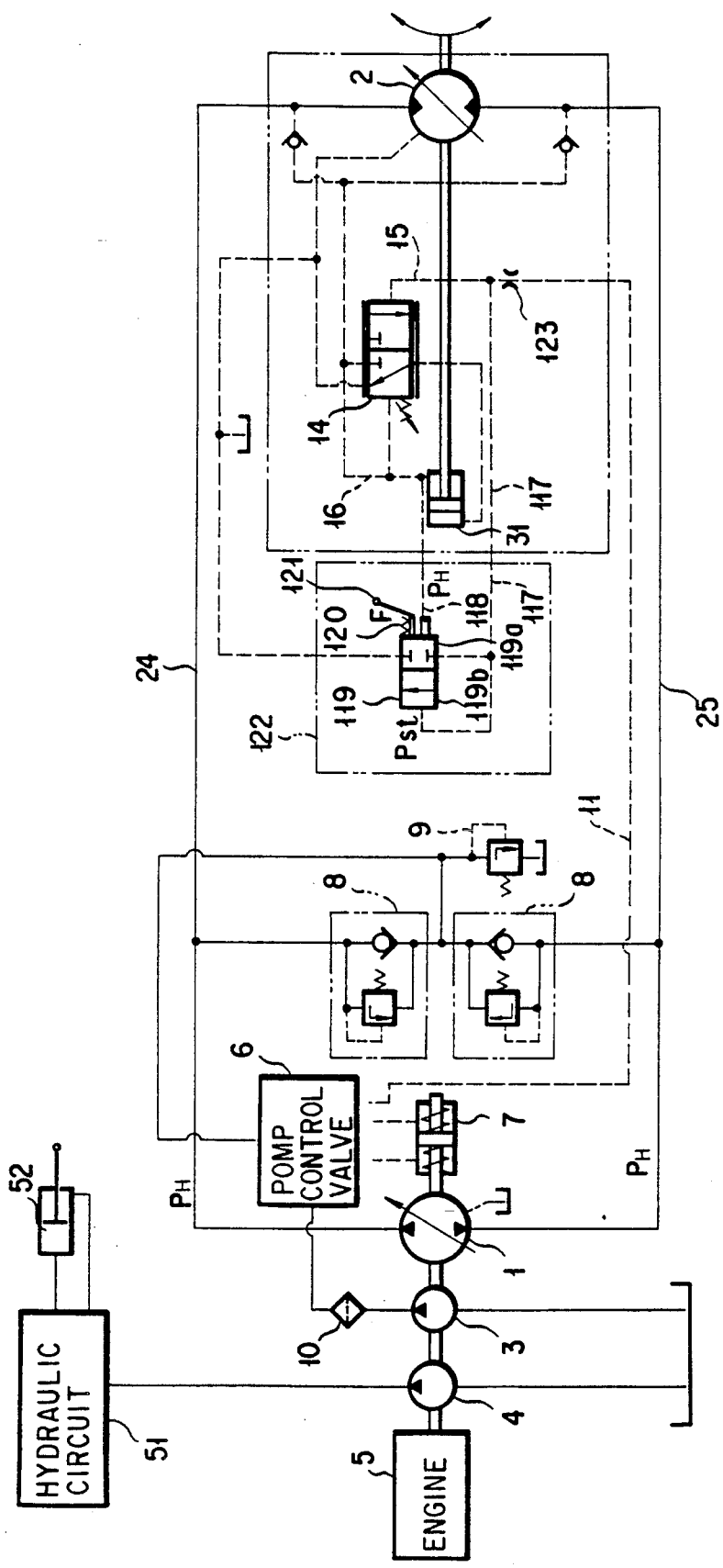
FIG. 2 is a diagram of a hydraulic circuit according to the invention, the circuit being installed on a hydraulically operated vehicle.

Referring to FIG. 2, there is shown a hydraulic circuit according to the invention, the circuit being installed on a nonstep variable speed, hydraulically operated vehicle using a variable delivery hydraulic pump and a motor. The main difference between the hydraulic circuits shown in FIGS. 1 and 2 is that the circuit shown in FIG. 2 has a vehicle speed limiter 122. Pressurized oil from the control pump 3 is forced into the motor control valve 14 via the pilot pipe 15. Another pilot pipe 117 extends from the pilot pipe 15 to one end of a pressure control valve 119. Oil at a higher pressure inside the main circuit 24 or 25 is forced into the motor control valve 14 through a pilot pipe 118, which extends to the other end of the valve 119.

The difference between the pressure inside the pilot pipe 117 and the pressure inside the pilot pipe 118 is balanced against the resilient force of the spring 120 inside the pressure control valve 119. The resilient force of the spring 120 can be adjusted at will with a manual lever 121. Also shown is an orifice 123.

The operation of the hydraulic circuit shown in FIG. 2 is now described. The higher pressure $P_H$ inside the main circuit 24 or 25 is also sent into the pilot pipe 118. Let $P_{ST}$ be the pressure inside the pilot pipe 117, A be the area of the pressure-receiving portion of the pressure control valve 119 on the side of the pilot pipe 117, B be the area of the pressure-receiving portion of the valve 119 on the side of the pilot pipe 118, and F be the resilient force of the spring 120. If the relation $$P_{ST} \cdot A \leq P_H \cdot B + F \quad (1)$$

holds, then the pressure control valve 119 is in position 119a. If the relation $$P_{ST} \cdot A > P_H \cdot B + F \quad (2)$$

holds, the valve 119 is in position 119b. The pressure inside the pilot pipe 117 is controlled by switching the valve 119 between the positions 119a and 119b.

Figure 3:
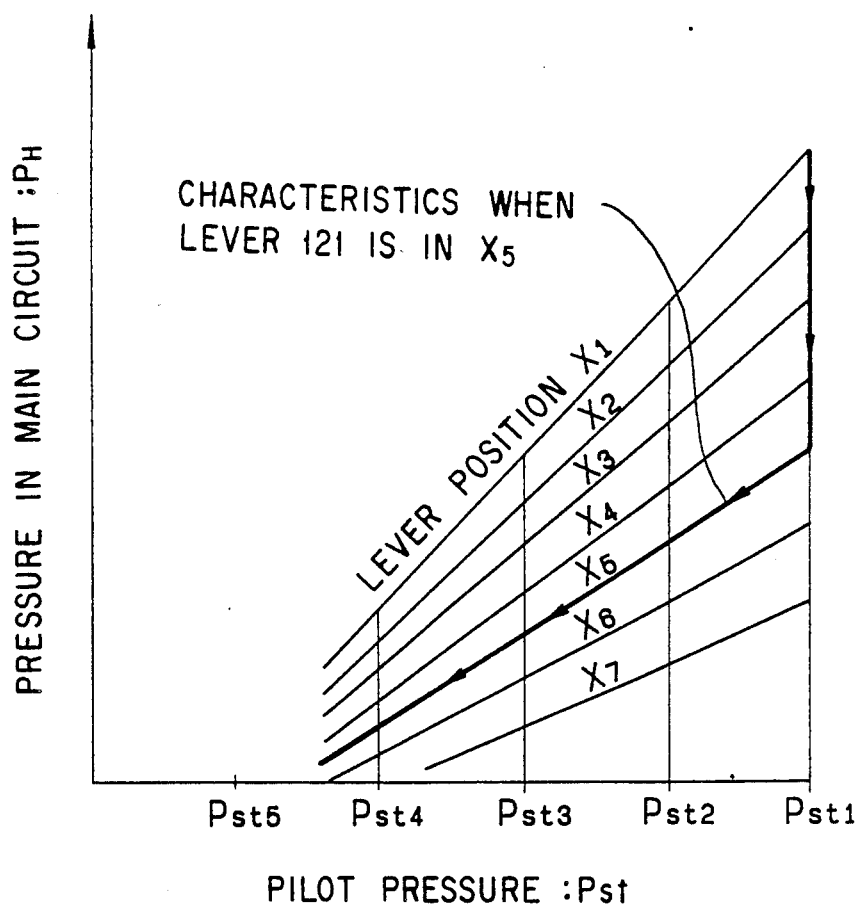
FIG. 3 is a graph illustrating the features of the pressure control valve shown in FIG. 2.

The characteristics of the pressure control valve 119 are shown in FIG. 3, where straight lines $X_1$, $X_2$, $X_3$, and so on show characteristics with which the valve 119 is switched from position 119a to position 119b. When the spring 120 is operated by the lever 121, the characteristics vary continuously.

Figure 4:
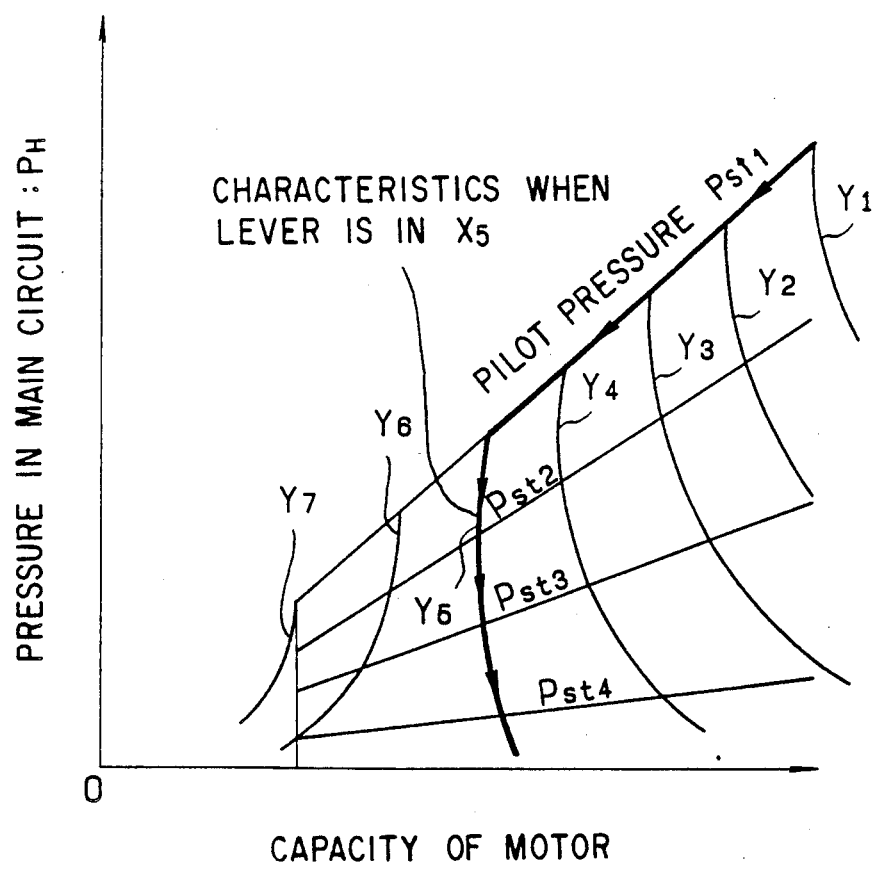
FIG. 4 is a graph showing the control characteristics of the variable delivery hydraulic motor incorporated in the hydraulic circuit shown in FIG. 2.
Figure 5:
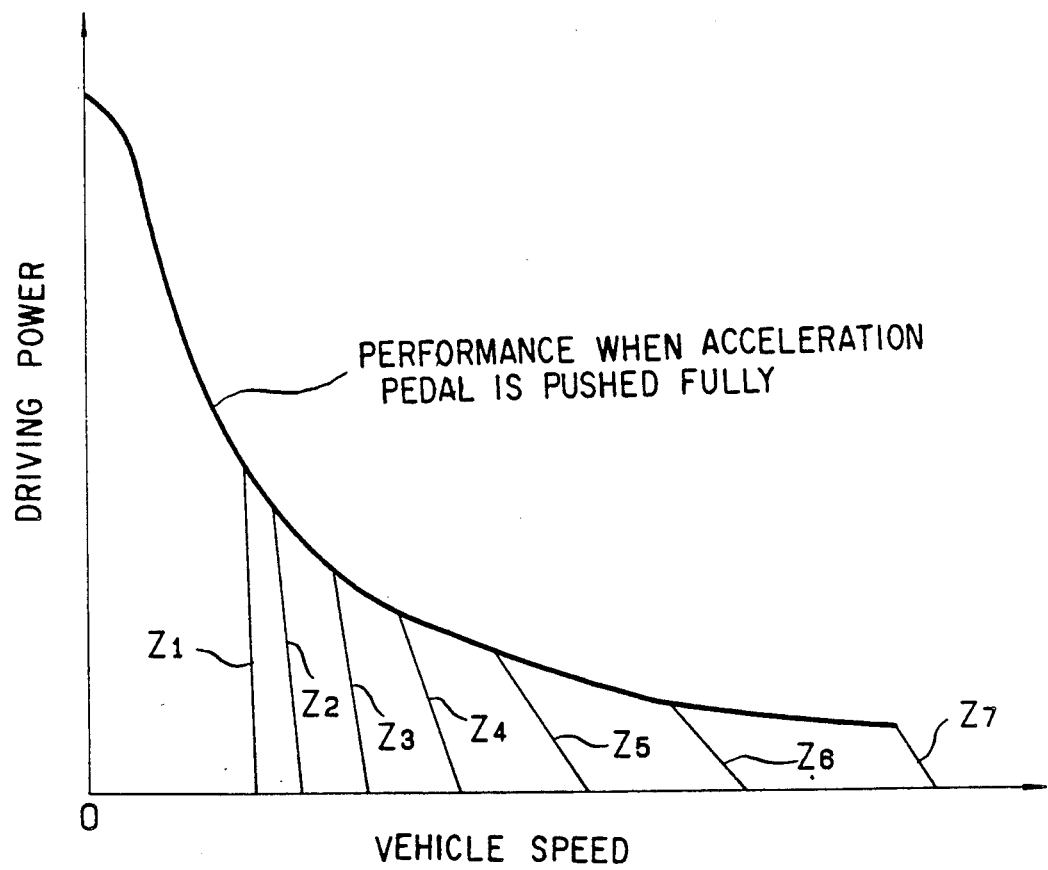
FIG. 5 is a graph illustrating limitation of the maximum speed of a hydraulically operated vehicle using the hydraulic circuit shown in FIG. 2, FIGS. 6 and 7 are diagrams of parts of other vehicle speed limiters.

In the graph of FIG. 4, the higher pressure $P_H$ in the main circuit of the hydraulic circuit is plotted against the capacity of the motor for several values of the pilot pressure $P_{ST}$. That is, the graph shows the control characteristics of the variable delivery hydraulic motor 2. The capacity of the motor assumes its minimum value on matching lines $Y_1$, $Y_2$, $Y_3$, and so on. In this way, the minimum capacity of the motor can be controlled at will. As shown in FIG. 5, the maximum vehicle speed can be continously varied between $Z_1$ and $Z_7$.

Figure 6:
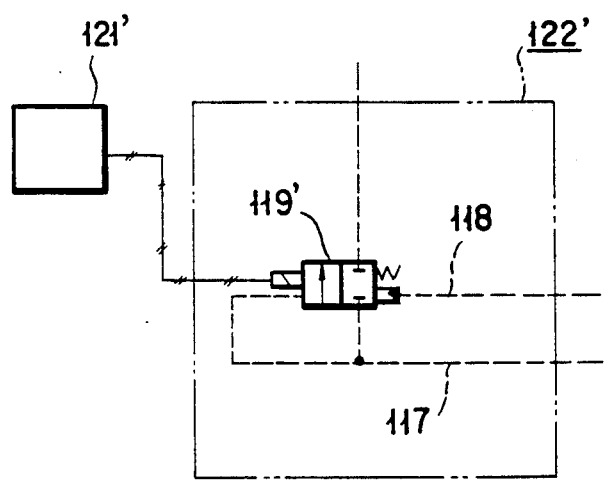

FIG. 6 shows another apparatus according to the invention. This apparatus is similar to the apparatus shown in FIG. 2 except that the vehicle speed limiter 122 and the lever 121 have been replaced with a vehicle speed limiter 122' and a control unit 121', and that the pressure control valve 119 has been replaced with a pressure control solenoid valve 119'. The control unit 121' produces an electrical current indicating an instruction to obtain the same characteristics as the characteristics shown in FIG. 4.

Figure 7:
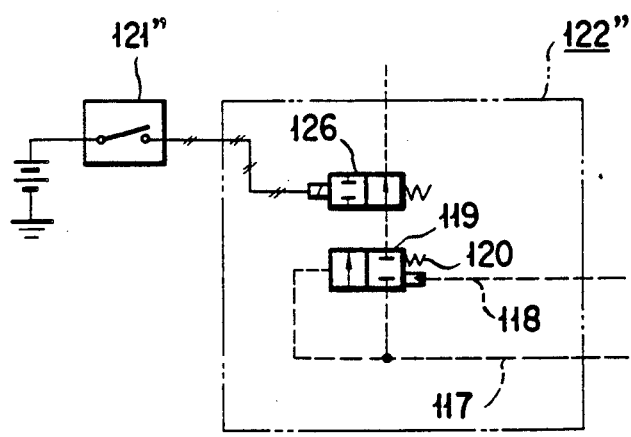

FIG. 7 shows a further apparatus according to the invention. This apparatus is similar to the apparatus shown in FIG. 2 except that the vehicle speed limiter 122 has been replaced by a vehicle speed limiter 122" using a solenoid selector valve 126 and a selector switch 121" instead of the lever 121 shown in FIG. 2. This selector switch 121" can be simply opened and closed to obtain only the characteristic at position 1 shown in FIG. 4.

What is claimed is:

1. An apparatus for controlling a variable delivery hydraulic motor installed upon a hydraulically operated vehicle, said apparatus comprising:
   a hydraulic pump;
   main circuits by which the hydraulic pump is connected with the variable delivery hydraulic motor;
   a cylinder that controls the capacity of the hydraulic motor;
   a control pump producing pilot hydraulic pressure acting upon the cylinder; and
   a limiting means which limits the minimum capacity of the hydraulic motor according to both higher hydraulic pressure inside the main circuits and pilot hydraulic pressure.

2. An apparatus for controlling a variable delivery hydraulic motor as set forth in claim 1, wherein said limiting means is a vehicle speed limiter.

3. An apparatus for controlling a variable delivery hydraulic motor as set forth in claim 2, wherein said vehicle speed limiter includes a pressure control valve which controls the pilot hydraulic pressure that is sent from the control pump into the cylinder to actuate this pump.

4. An apparatus for controlling a variable delivery hydraulic motor as set forth in claim 3, wherein the pilot pressure acting upon one side of the pressure control valve is balanced against the resilient force of a spring which acts upon the other side and can be adjusted with a manual lever.

5. An apparatus for controlling a variable delivery hydraulic motor as set forth in claim 3, wherein said pressure control valve is a solenoid valve having a control unit.

6. An apparatus for controlling a variable delivery hydraulic motor as set forth in claim 3, wherein said pressure control valve is switched between plural positions by a solenoid selector valve and a selector switch.

7. An apparatus for controlling a variable delivery hydraulic motor installed upon a hydraulically operated vehicle, said apparatus comprising:
   a hydraulic pump;
   main circuits by which the hydraulic pump is connected with the variable delivery hydraulic motor;
   a cylinder that controls the capacity of the hydraulic motor;
   a control pump producing pilot hydraulic pressure acting upon the cylinder; and
   a limiting means comprised of a pressure control valve that limits the minimum capacity of the hydraulic motor according to the higher hydraulic pressure inside the main circuits, the pilot hydraulic pressure, and an operator controlled lever.

* * * * *